United States Patent
Mochizuki

(10) Patent No.: US 10,290,037 B2
(45) Date of Patent: May 14, 2019

(54) LIST PRESENTATION DEVICE, LIST PRESENTATION METHOD, AND PROGRAM

(71) Applicant: Rakuten, Inc., Tokyo (JP)

(72) Inventor: Daisuke Mochizuki, Tokyo (JP)

(73) Assignee: Rakuten, Inc., Tokyo (JP)

(*) Notice: Subject to any disclaimer, the term of this patent is extended or adjusted under 35 U.S.C. 154(b) by 601 days.

(21) Appl. No.: 14/900,823

(22) PCT Filed: Jun. 24, 2013

(86) PCT No.: PCT/JP2013/067295
§ 371 (c)(1),
(2) Date: Dec. 22, 2015

(87) PCT Pub. No.: WO2014/207813
PCT Pub. Date: Dec. 31, 2014

(65) Prior Publication Data
US 2016/0140640 A1    May 19, 2016

(51) Int. Cl.
*G06Q 30/06* (2012.01)
*G06Q 30/02* (2012.01)
*G06Q 10/08* (2012.01)

(52) U.S. Cl.
CPC ......... *G06Q 30/0625* (2013.01); *G06Q 30/02* (2013.01); *G06Q 30/0623* (2013.01);
(Continued)

(58) Field of Classification Search
None
See application file for complete search history.

(56) References Cited

U.S. PATENT DOCUMENTS

| 8,244,564 B2 * | 8/2012 | Selinger | G06Q 30/02 705/7.11 |
| 9,215,420 B2 * | 12/2015 | Suslov | G06F 17/3053 |

(Continued)

FOREIGN PATENT DOCUMENTS

| JP | 10-187403 A | 7/1998 |
| JP | 2003-016349 A | 1/2003 |

(Continued)

OTHER PUBLICATIONS

Machine translation of JP 2007-156788 A, performed Jun. 18, 2018.*

(Continued)

*Primary Examiner* — Nicholas D Rosen
(74) *Attorney, Agent, or Firm* — Sughrue Mion, PLLC

(57) ABSTRACT

A list presentation device generates list information that is sent to a first user and includes a plurality of items each indicating a trade object, obtains an item that is selected by the first user among the plurality of items included in the list information, lowers, in a case where a first item is selected by the first user among the items included in the list information, display priority stored in a storage in association with a trade object indicated by a second item, which has been selected before by the first user among the plurality of items included in the list information, and generates new list information, which is sent to a second user, based on a transmission request from the second user and the display priority stored in the storage.

14 Claims, 12 Drawing Sheets

(52) U.S. Cl.
CPC ....... *G06Q 30/0641* (2013.01); *G06Q 10/087* (2013.01); *G06Q 30/0633* (2013.01); *G06Q 30/0643* (2013.01)

(56) References Cited

U.S. PATENT DOCUMENTS

| | | | | |
|---|---|---|---|---|
| 9,256,647 | B2* | 2/2016 | Umeda | G06Q 30/0601 |
| 2010/0250336 | A1* | 9/2010 | Selinger | G06Q 30/02 |
| | | | | 705/26.7 |
| 2011/0296463 | A1* | 12/2011 | Suslov | G06F 17/3053 |
| | | | | 725/44 |
| 2012/0041846 | A1* | 2/2012 | Rehman | G06Q 30/06 |
| | | | | 705/27.1 |
| 2012/0278127 | A1* | 11/2012 | Kirakosyan | G06Q 30/0631 |
| | | | | 705/7.29 |
| 2013/0325854 | A1* | 12/2013 | Umeda | G06F 17/3053 |
| | | | | 707/723 |
| 2015/0012387 | A1* | 1/2015 | Katagiri | G06Q 30/02 |
| | | | | 705/26.64 |

FOREIGN PATENT DOCUMENTS

| | | | |
|---|---|---|---|
| JP | 2003-030689 A | | 1/2003 |
| JP | 2007-156788 A | | 6/2007 |
| JP | 2008-243033 A | | 10/2008 |
| WO | WO-2013/018389 A1 | * | 2/2013 |

OTHER PUBLICATIONS

Machine translation of JP 2008-243033 A, performed Jun. 18, 2018.*

International Search Report of PCT/JP2013/067295 dated Sep. 17, 2013.

* cited by examiner

FIG.7

RESTAURANT DINING

JAPANESE FOOD
FUJI
tel 03-9999-9999
BUDGET: APPROX. 6,000 YEN
ACCESS: 10-MINUTE WALK FROM GINZA STATION

| DESCRIPTION | MENU | MAP | |

Photo

ADDRESS: X BLDG. 2ND FLOOR, △-□, GINZA 3-CHOME, CHUO-KU, TOKYO

FIG.9

| SERVICE ID | NAME | CATEGORY | AREA | INTRODUCTORY SENTENCE | POPULARITY | BUDGET | ACCESS |
|---|---|---|---|---|---|---|---|
| r0001 | FUJI | JAPANESE | TOKYO>GINZA | TASTEFUL FOOD | 3 | 6000 | 10-MINUTE WALK FROM GINZA STATION |
| r0002 | KABU | JAPANESE | TOKYO>SHINJUKU | ELEGANT APPEARANCE | 1 | 8000 | 8-MINUTE WALK FROM EAST EXIT OF SHINJUKU STATION |
| r0003 | YOTO | WESTERN | TOKYO>GINZA | FOOD TO MAKE YOU FULL | 1 | 4000 | 20-MINUTE WALK FROM GINZA STATION |
| r0004 | AI | JAPANESE | TOKYO>GINZA | REASONABLE PRICE | 1 | 3000 | 12-MINUTE WALK FROM GINZA STATION |
| r1010 | ICHIBAN | JAPANESE | TOKUSHIMA>GINZA | PLENTY OF SEAFOOD | 2 | 5000 | 10-MINUTE WALK FROM TOKUSHIMA STATION |

FIG.10

| SERVICE ID | SEARCH KEYWORD | SEARCH CATEGORY | DISPLAY PRIORITY | UPDATE TIME |
|---|---|---|---|---|
| r0001 | GINZA | JAPANESE FOOD | −5 | APRIL 1   18:55 |
| r1010 | GINZA | JAPANESE FOOD | −3 | APRIL 1   18:00 |
| r0002 | SHINJUKU | WESTERN FOOD | −30 | APRIL 1   18:10 |
| r0004 | GINZA | JAPANESE FOOD | 0 | MARCH 31   21:30 |

FIG.12

| USER ID | SELECTION TIME | SERVICE ID | LIST ID | SEARCH KEYWORD | SEARCH CATEGORY |
|---|---|---|---|---|---|
| userA | APRIL 1 18:50 | r0001 | 0111 | GINZA | JAPANESE |
| userB | APRIL 1 17:55 | r1010 | 0211 | GINZA | JAPANESE |
| userZ | APRIL 1 17:48 | r3001 | 5011 | SHINJUKU | FRENCH |
| userZ | APRIL 1 17:50 | r3002 | 5011 | SHINJUKU | FRENCH |

FIG.13

| SERVICE ID | SEARCH KEYWORD | SEARCH CATEGORY | DETERMINATION COUNT | UPDATE TIME |
|---|---|---|---|---|
| r0001 | GINZA | JAPANESE | 10 | 19:00:01 |
| r1010 | GINZA | JAPANESE | 5 | 18:50:45 |
| r0002 | SHINJUKU | WESTERN | 185 | 18:10:03 |
| r0004 | GINZA | JAPANESE | 0 | 18:50:46 |

FIG.14

| SERVICE ID | SEARCH KEYWORD | SEARCH CATEGORY | DISPLAY PRIORITY | UPDATE TIME |
|---|---|---|---|---|
| r0001 | GINZA | JAPANESE | 0 | APRIL 1  21:55 |
| r1010 | GINZA | JAPANESE | −3 | APRIL 1  21:05 |
| r0002 | SHINJUKU | WESTERN | −15 | APRIL 1  21:20 |
| r0004 | GINZA | JAPANESE | 0 | MARCH 31 21:30 |

LIST PRESENTATION DEVICE, LIST PRESENTATION METHOD, AND PROGRAM

CROSS REFERENCE TO RELATED APPLICATIONS

This is a National Stage of International Application No. PCT/JP2013/067295 filed Jun. 24, 2013, the contents of which are incorporated herein by reference in its entirety.

TECHNICAL FIELD

The present invention relates to a list presentation device, a list presentation method, and a program.

BACKGROUND ART

There is a service presenting a user with a list of products and services as a search result, such as a website for introducing food services and restaurants providing the food services (restaurant information site) and a website for selling goods (shopping site). Typically, systems of the restaurant information websites are not managing whether restaurants are fully booked. As such, in most cases, a user who uses the restaurant information sites selects a restaurant from the list of food service information, and personally inquires the restaurant about availability by telephone, for example. Further, a user who uses services of the shopping sites views information of some of the products shown in the list, and selects a product to purchase.

Further, technologies exist that display information of frequently accessed products included in a list at the top of the list, and present the list.

CITATION LIST

Patent Document

Patent Literature 1: JP2003-16349A

SUMMARY OF INVENTION

Technical Problem

When a user views or purchases products or services in the list, sometimes a facility providing the service is fully booked or the products are out of stock, or types of the listed products or services do not match the conditions for obtaining the list. In such cases, it is difficult for the user to purchase the service or the product, and it may be also difficult for other users to purchase the service or the product. On the other hand, when the site does not manage the stock of products or services, the site cannot directly detect the cases described above, and thus the site does not change the manners of presenting information of the product or the service to other users. In other words, information about the products or the services that are fully booked or out of stock or do not match the conditions for obtaining the list is presented to other users, and thereby the users have to take time to inquire the fully booked facility or view the information of the service or the product.

One or more embodiments of the present invention have been conceived in view of the above, and an object thereof is to reduce possibility of providing a user with information about a product or a service that is difficult to be offered to the user for the reasons that, for example, a facility to provide the service is fully booked, or the products are out of stock when the stock of the products or the services are not managed.

Solution to Problem

In order to solve the above described problems, a list presentation device according to the present invention includes list generating means for generating list information that is sent to a first user and includes a plurality of items each of which indicates a trade object, selected item obtaining means for obtaining an item that is selected by the first user among the plurality of items included in the list information, and display priority changing means for lowering, in a case where a first item, which is one of the items included in the list information, is selected by the first user, display priority stored in storing means in association with a trade object indicated by a second item, which has been selected before by the first user among the plurality of items included in the list information. The list generating means generates new list information, which is sent to a second user, based on a transmission request from the second user and the display priority stored in the storing means.

A list presentation method according to the present invention includes generating list information that is sent to a first user and includes a plurality of items each of which indicates a trade object, obtaining an item that is selected by the first user among the plurality of items included in the list information, lowering, in a case where a first item, which is one of the items included in the list information, is selected by the first user, display priority stored in storing means in association with a trade object indicated by a second item, which has been selected before by the first user among the plurality of items included in the list information, and generating new list information, which is sent to a second user, based on a transmission request from the second user and the display priority stored in the storing means.

A program according to the present invention causes a computer to execute processing of generating list information that is sent to a first user and includes a plurality of items each of which indicates a trade object, obtaining an item that is selected by the first user among the plurality of items included in the list information, lowering, in a case where a first item, which is one of the items included in the list information, is selected by the first user, display priority stored in storing means in association with a trade object indicated by a second item, which has been selected before by the first user among the plurality of items included in the list information, and generating new list information, which is sent to a second user, based on a transmission request from the second user and the display priority stored in the storing means.

A computer-readable storage medium according to the present invention stores the program.

According to the present invention, it is possible to reduce possibility of providing a user with information about a trade object that is difficult to be offered to the user for the reasons that, for example, a facility to provide the service is fully booked, when the stock of the products or the services are not managed.

In an embodiment of the present invention, the list generating means may generate the list information that is sent to the first user and includes the plurality of items according to a search condition from the first user. In a case where a first item, which is one of the items included in the list information, is selected by the first user, the display priority changing means may lower the display priority stored in the storing means in association with the search condition and the trade object indicated by the second item, which has been selected before by the first user among the plurality of items included in the list information. The list generating means may generate new list information that is sent to the second user based on the search condition included in the transmission request from the second user and the display priority stored in the storing means in association with the search condition and the trade object.

According to this embodiment, it is possible to reduce possibility of providing a user with information about a product or a service that is not appropriate to be displayed in view of a search condition.

In an embodiment of the present invention, an item selected by the first user among the plurality of items included in the list information and a time at which the first user selects the item may be stored in the storing means that stores the item and the time in association with the first user and the list information. In a case where an interval between the time at which the first user selects the first item from the list information and the time at which the first user selects the second item from the list information is in a given range, the display priority changing means may lower the display priority of the second item.

In an embodiment of the present invention, the display priority changing means may lower the display priority of the second item based on a number of users who select the second item, which is one of the plurality of items included in the list information, before selecting the first item, which is one of the plurality of items.

In an embodiment of the present invention, in a case where the first user selects the first item, which is one of the items included in the list information, the display priority changing means may lower the display priority of the second item based on an attribute associated with a trade object indicated by the first item and an attribute associated with the trade object indicated by the second item.

In an embodiment of the present invention, in a case where the first user selects the first item, which is one of the items included in the list information, the display priority changing means may lower the display priority of the second item based on a price of the trade object indicated by the first item and a price of the trade object indicated by the second item.

In an embodiment of the present invention, in a case where the first user selects the first item, which is one of the items included in the list information, the display priority changing means may lower the display priority of the second item based on information about a position of the trade object indicated by the first item and information about a position of the trade object indicated by the second item.

In an embodiment of the present invention, in a case where the first user selects the first item, which is one of the items included in the list information, the display priority changing means may lower the display priority of the second item based on a category to which the trade object indicated by the first item belongs and a category to which the trade object indicated by the second item belongs.

In an embodiment of the present invention, the list generating means may determine some of the trade objects that satisfy the search condition included in the transmission request from the second user as list generation target based on the display priority stored in the storing means, and, in a case where a number of the determined trade objects is smaller than a threshold value, generate new list information that includes a plurality of items respectively indicating the determined trade objects and a plurality of trade objects that satisfy a condition obtained by partially changing the search condition.

In an embodiment of the present invention, in a case where the number of the determined trade objects is smaller than the threshold value, the list generating means may generate new list information that includes a plurality of items respectively indicating the determined trade objects and a plurality of trade objects that satisfy a condition obtained by changing the search condition such that an area to which the trade objects belong is changed to an area neighboring or adjacent to the area.

In an embodiment of the present invention, in a case where the number of the determined trade objects is smaller than the threshold value, the list generating means may generate new list information that includes a plurality of items respectively indicating the determined trade objects and the trade objects that satisfy a condition obtained by changing the search condition such that an area to which the trade objects belong is changed to an area in a moving direction of the second user.

In an embodiment of the present invention, the display priority changing means may return the lowered display priority to an initial value according to a lapse of time.

BRIEF DESCRIPTION OF DRAWINGS

FIG. 7 is a diagram illustrating an example of a detailed screen;

FIG. 9 is a diagram illustrating an example of product/ service information;

FIG. 10 is a diagram illustrating an example of priority information;

FIG. 12 is a diagram illustrating an example of selection history;

FIG. 13 is a diagram illustrating an example of determination count information; and FIG. 14 is a diagram illustrating an example of priority information after a predetermined period of time has passed since FIG. 10.

DESCRIPTION OF EMBODIMENTS

Figure 1:
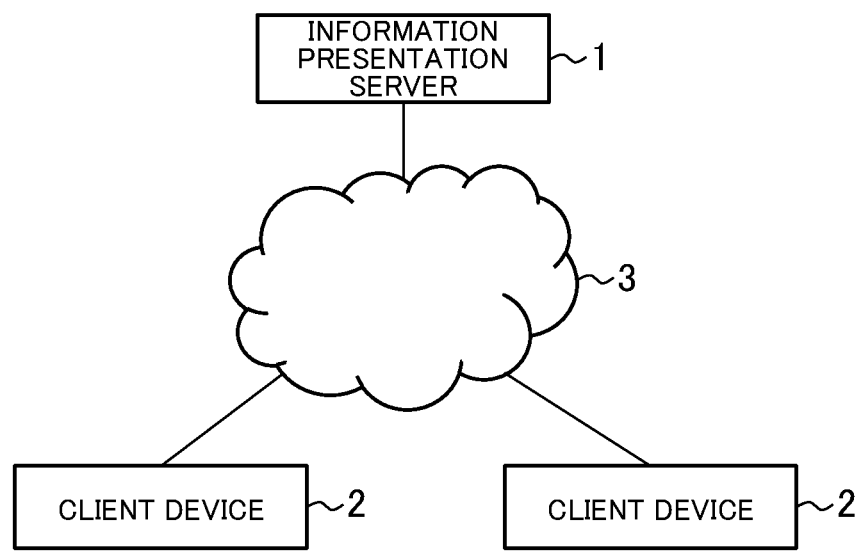
FIG. 1 is a diagram illustrating an example of a configuration of an information presentation system according to an embodiment of the present invention.

An embodiment of the present invention will be described below with reference to the accompanying drawings. Regarding the elements designated with the same reference numerals, their overlapping explanation will be omitted. If not otherwise stated, the discussion focuses on an example of a restaurant information site. Here, an object to be traded, such as a product or a service, is described as a "trade object." This embodiment can be applied not only to a restaurant information site featuring food services but also to sites featuring various types of trade objects.

FIG. 1 illustrates an example of a configuration of an information presentation system according to the embodiment of the present invention. The information presentation system includes an information presentation server 1 and client devices 2, which are connected one another via a network 3. The network 3 is, for example, a local area network or the Internet.

The information presentation server 1 is a server computer. The information presentation server 1 obtains information from a database, for example, in response to a request from the client device 2, and sends the obtained information to the client device 2. The client device 2 is a computer such as a smartphone or a personal computer. Here, the information presentation server 1 executes a web server program (e.g., httpd), the client device 2 executing a browser program sends a request entered by a user to the information presentation server 1, and a screen according to the information sent from the information presentation server 1 is presented to the user.

Figure 2:
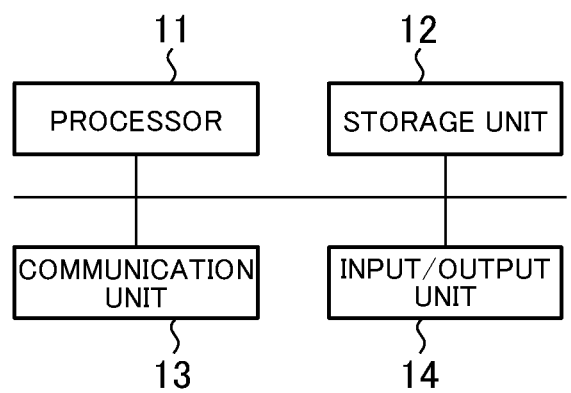
FIG. 2 is a diagram illustrating an example of a hardware configuration of an information presentation server.

FIG. 2 illustrates an example of a hardware configuration of the information presentation server 1. The information presentation server 1 includes a processor 11, a storage unit 12, a communication unit 13, and an input/output unit 14.

The processor 11 operates in accordance with a program stored in the storage unit 12. The processor 11 controls the communication unit 13 and the input/output unit 14. The program may be provided via the Internet or by being stored in a computer-readable storage medium such as a flash memory or a DVD-ROM.

The storage unit 12 includes a memory device such as a RAM or a flash memory, and a hard disk drive. The storage unit 12 stores the program. The storage unit 12 also stores information and computational results input from each unit.

The communication unit 13 implements functions to communicate with other devices, and includes an integrated circuit of a wireless LAN and an antenna, for example. The communication unit 13 inputs information received from other devices into the processor 11 and the storage unit 12, and sends information to other devices under the control of the processor 11.

The input/output unit 14 includes a video controller for controlling display output means, and a controller for obtaining data from an input device. The input device includes a keyboard, a mouse, and a touch panel. The input/output unit 14 outputs display data to a display output device under the control of the processor 11, and obtains data entered by the user operating the input device. The display output device is, for example, a display device connected to the outside. Similarly to the information presentation server 1, the client device 2 also includes a processor 11, a storage unit 12, a communication unit 13, and an input/output unit 14. The input/output unit included in the client device 2 outputs display data to, for example, a display built in a smartphone.

Figure 3:
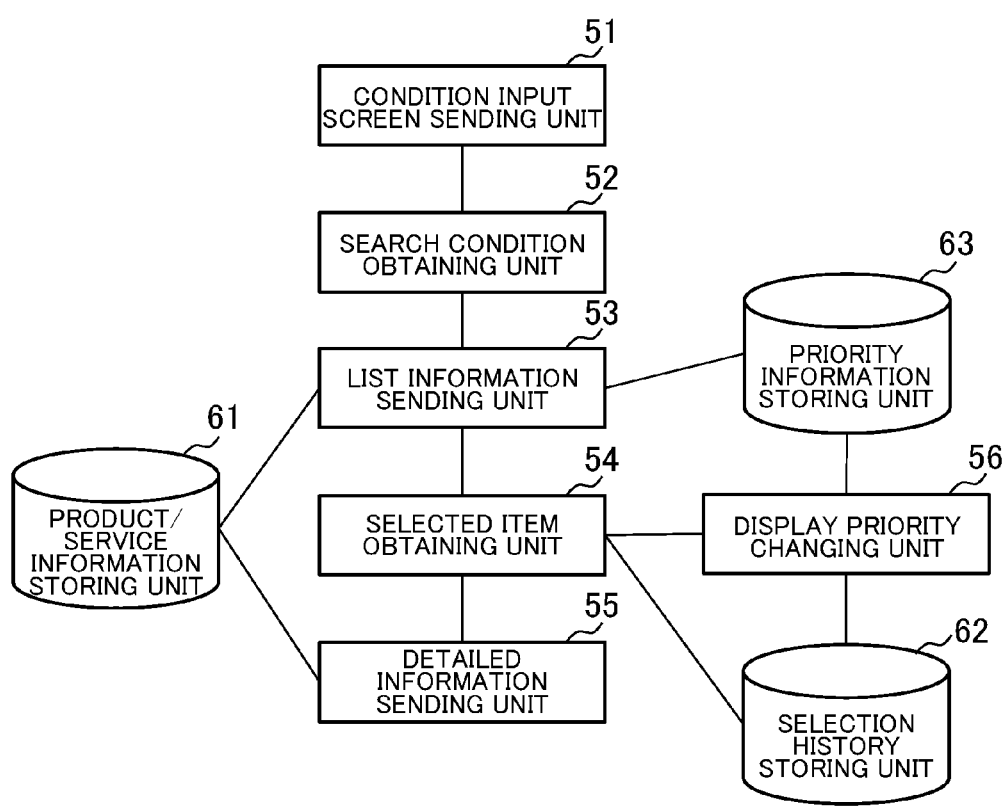
FIG. 3 is a functional block diagram illustrating functions implemented by the information presentation server.

FIG. 3 is a functional block diagram showing functions implemented by the information presentation server 1. The information presentation server functionally includes a condition input screen sending unit 51, a search condition obtaining unit 52, a list information sending unit 53, a selected item obtaining unit 54, a detailed information sending unit 55, a display priority changing unit 56, a product/service information storing unit 61, a selection history storing unit 62, and a priority information storing unit 63. These function are implemented when the processor 11 included in the information presentation server 1 executes a program stored in the storage unit 12 and controls the communication unit 13, for example. The product/service information storing unit 61 is a database for storing information relating to products and services (some types of trade objects) presented by the information presentation server 1. The selection history storing unit 62 and the priority information storing unit 63 respectively store information about selection history and display priority, which are described later. The product/service information storing unit 61, the selection history storing unit 62, and the priority information storing unit 63 are mainly implemented by the storage unit 12 in the information presentation server 1, but may be implemented in other server computer that is independent from the information presentation server 1 and executes a database program.

The client device 2 executes a browser program, outputs images to the display output device based on the data received from the information presentation server 1 thereby presenting information to the user, and sends information input by the user using a touch panel or a keyboard to the insurance application server 1.

Figure 4:
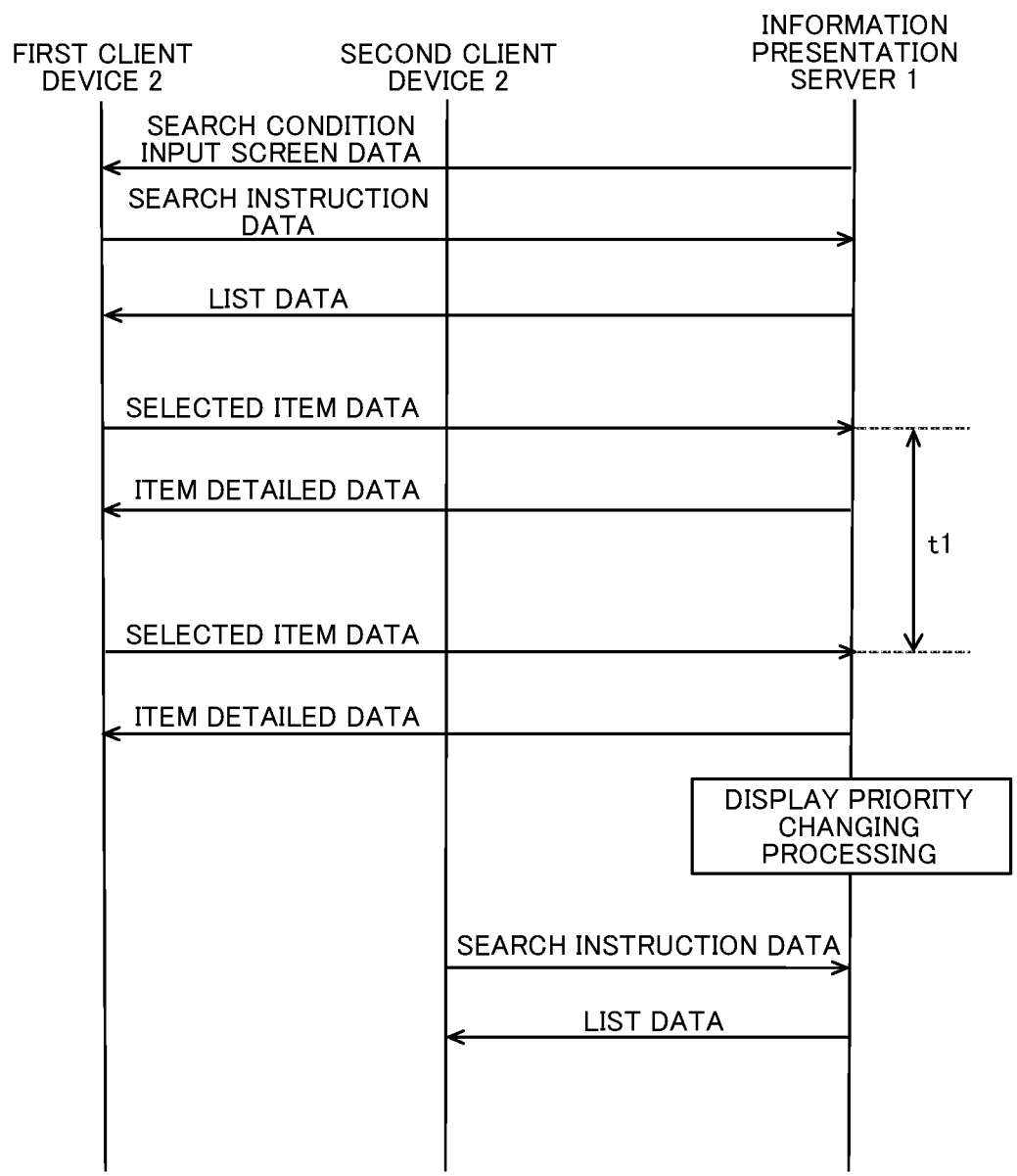
FIG. 4 is a schematic sequence diagram indicating operation of the information presentation system.

FIG. 4 is a sequence diagram showing the outline of operations in the information presentation system. This sequence diagram shows the time sequence of communication among a first client device 2 operated by a user (first user), a second client device 2 operated by another user (second user), and the information presentation server 1. First, a relationship between the functional block and data exchanged between the client device 2 and the information presentation server 1 will be discussed.

The condition input screen sending unit 51 in the information presentation server 1 is mainly implemented by the processor 11, the storage unit 12, and the communication unit 13. The condition input screen sending unit 51 sends search condition input screen data to the client devices 2. The search condition input screen data is information about the screen for the user to input the search condition of products or services. This enables the client device 2 to display the search condition input screen on the display output device viewed by the user, and to allow the user to input search conditions.

Figure 5:
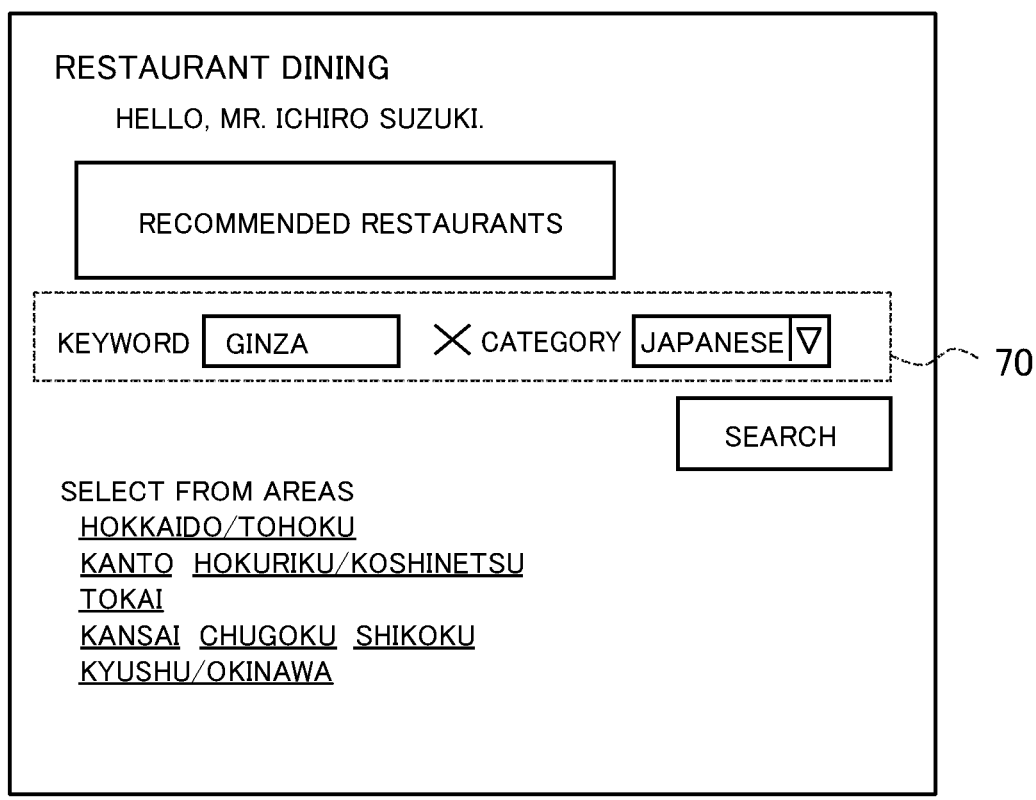
FIG. 5 is a diagram illustrating an example of a search condition input screen.

FIG. 5 illustrates an example of a search condition input screen. The screen shown in FIG. 5 is a top page of the restaurant information site that is displayed on the screen of the client device 2 after the specific URL is entered, and has a search condition input area 70 which includes an area for entering search keywords and an area for selecting categories of food services. In the following, a case where the information presentation server implements the restaurant information site will be mainly discussed. When the user enters a search condition, such as a keyword or a category, in the search condition input area 70 and presses "Search", the client device 2 sends search instruction data including the search conditions to the information presentation server 1.

The search condition obtaining unit 52 in the information presentation server 1 is mainly implemented by the processor 11, the storage unit 12, and the communication unit 13. The search condition obtaining unit 52 receives the search instruction data from the client device 2, and obtains the search condition entered by the user.

The list information sending unit 53 is mainly implemented by the processor 11, the storage unit 12, and the communication unit 13. The list information sending unit 53 searches the product/service information storing unit 61 based on the obtained search condition, generates list data, which is information indicating a list of items each of which is a trade object, and sends the generated list data to the client device 2 operated by the user. This enables the client device 2 to display a list screen on the display output device. The list information sending unit 53 may send list data indicating a list of existing items, instead of performing search with use of the search condition.

Figure 6:
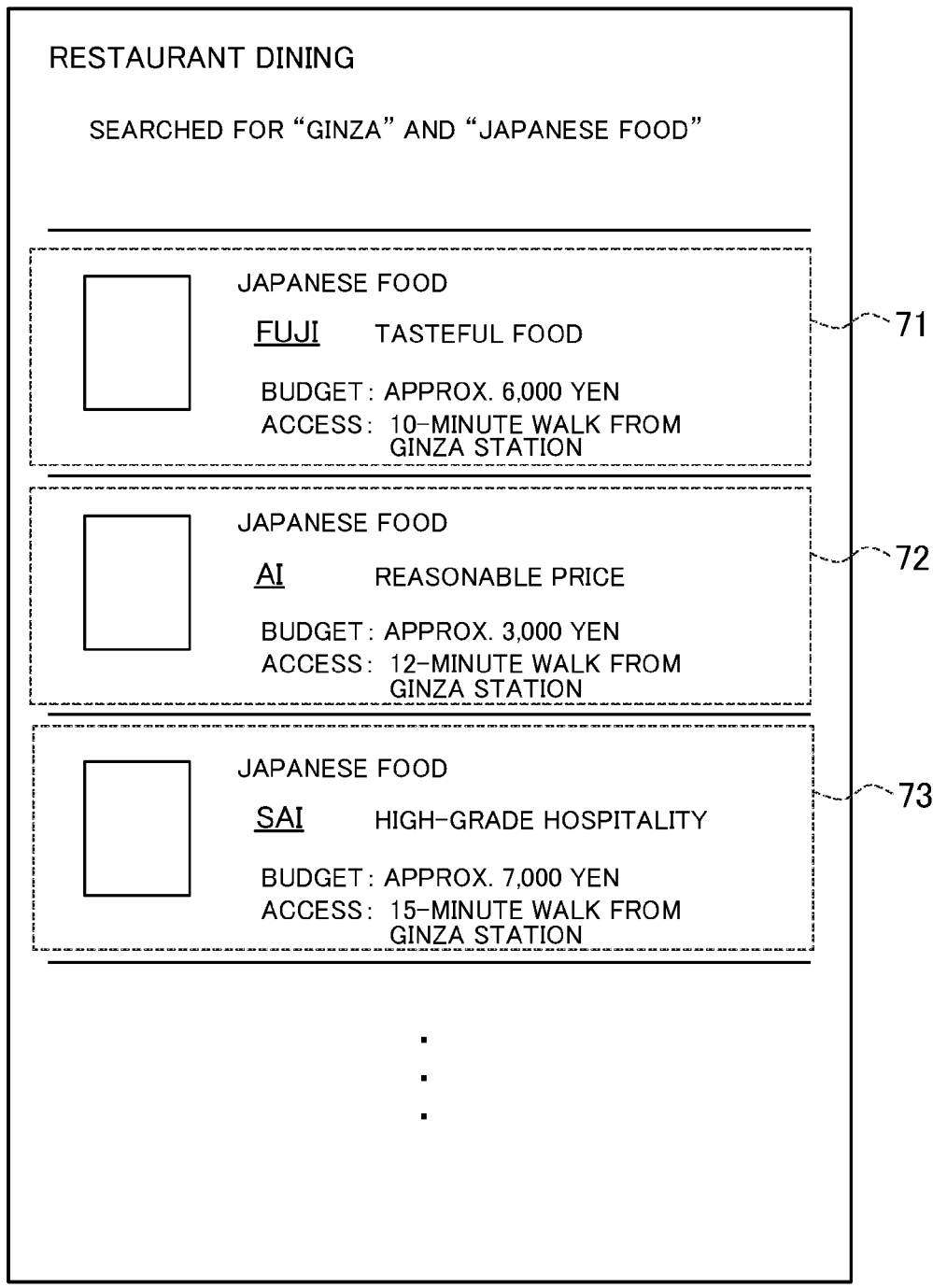
FIG. 6 is a diagram illustrating an example of a list screen.

FIG. 6 illustrates an example of a list screen. The list shown in FIG. 6 is a list of restaurants (food services) displayed when searched with a keyword "Ginza" and a category "Japanese food" as search conditions. In the following, each food service included in the list is described as an "item" of the list. The screen shown in FIG. 6 displays information of items 71 to 73, although actually information of more number of items is displayed. For each item, the list screen shows information about an overview of a product or a service, such as a name and a photograph of a food service facility, an estimated budget for services, and an access to the facility. When the user selects any one of the items by clicking the link or the like, the client device 2 sends selected item data including information (service ID) for specifying the selected item and information (list ID, search condition) for specifying the list to the information presentation server 1. The items in the list may indicate other types (product etc.) of trade objects.

In the example of FIG. 6, the items in the list indicate information about restaurants searched according to the search condition, although the items may indicate information about restaurants selected by the site operator in advance. Further, the list screen shows information about services (restaurants) because an example of the restaurant information site is discussed here, although information about products may be displayed instead of the food service facilities if the site sells products, for example.

The upper limit number of items displayed on a list screen (maximum display number) may be determined. For example, the list information sending unit 53 may send data of the screen including the maximum display number of items in the search result to the client device 2, and subsequently, in a case where the client device 2 sends data indicating that the user has pressed a button to display the next page, send data of the screen including the next maximum display number of items to the client device 2. Further, in a case where the client device 2 obtains and sends information about the user's operation to scroll to the bottom of the list screen that displays the maximum display number of items and the list information sending unit 53 receives the information indicating such operation, the list information sending unit 53 may send information about the item to be displayed in the list to the client device 2.

The selected item obtaining unit 54 receives the selected item data from the client device 2, and obtains the item selected by the user in the list. The selected item obtaining unit 54 then stores a service ID of the item in association with a list ID, the search condition, and the user to the selection history storing unit 62.

The detailed information sending unit 55 sends item detailed data, which includes information about a product or a service corresponding to the selected item, to the client device 2. This enables the client device 2 to display a detailed screen on the display output device.

FIG. 7 illustrates an example of a detailed screen. The detailed screen shown in FIG. 7 displays information including the description of the restaurant, meals offered in the restaurant, and a map and a telephone number of the restaurant, in addition to the content displayed on the list screen.

The display priority changing unit 56 performs processing ("display priority changing processing" in FIG. 4) for changing information about display priority in order to control an order of items displayed on the list and whether the items are displayed on the list. Details of processing will be discussed below.

Next, the flow of the processing for a representative case will be discussed using FIG. 4. First, when a first user who operates the first client device 2 accesses a search condition input screen of the information presentation server 1 by a browser, the condition input screen sending unit 51 in the information presentation server 1 sends the search condition input screen data to the first client device 2, and the client device 2 displays the search condition input screen. Subsequently, when the first user gives searching instruction on the search condition input screen, the first client device 2 sends search instruction data. When the search condition obtaining unit 52 in the information presentation server 1 obtains the search instruction data, the list information sending unit 53 searches information about services stored in the product/service information storing unit 61, generates list data, which is information about a list including searched services, and sends the generated list data.

Upon receiving the list data, the first client device 2 displays the list screen on the display output device. The first user determines desired services in the list as candidates, and selects the item in the list. For example, in FIG. 6, assuming that the restaurant "Fuji" is selected. Then, the first client device 2 sends the selected item data, and the detailed information sending unit 55 in the information presentation server 1 sends item detailed data in response to the selected item data. The client device 2 displays the detailed screen such as shown in FIG. 7, on the display output device.

Subsequently, the first user sees the detailed screen and determines whether to use the restaurant (to receive the service). If the user determines to receive the service, the user calls the phone number of the restaurant displayed on the screen and asks if it is possible to book the restaurant. If the restaurant is available, the first user stops using the restaurant information site, and does not select other item in the list. Also in a case where the first user uses a screen for reservation to reserve the restaurant, the user does not select other item in the list once the reservation is finished. In a case where details of a product are displayed on a shopping site, the user determines whether to purchase the product, and when the user determines to purchase the product, continues the purchase operation by putting the product in the shopping cart, for example. In this case also, the first user does not usually select other item in the list.

On the other hand, when the restaurant is fully booked and reservation is not possible, the first user presses a "Return" button on the browser or the like, to return to the list screen, and presses the next item (e.g., "Ai" in FIG. 6) in the candidates. The first client device 2 then sends the selected item data to the information presentation server 1, and the information presentation server 1 sends item detailed data of the newly selected item to the client device 2. When the first user finds any problem on the detailed screen and excludes such item from the candidates, typically the first user selects the next item in the candidates, and the first client device 2 sends the selected item data to the information presentation server 1. Here, a time interval t1 is an interval between the time when the previous selected item data is received and the time when the current selected item data is received. The use of the time interval t1 will be discussed below.

As described, in a case where, before the first user selects an item (first item) from the list on the list screen, the first user selects other item (second item) in the same list, it may be difficult for the first user to receive the product or the service corresponding to the previously selected second item. This may cause difficulties for other users to receive the product or the service. The display priority changing processing utilizes this to change display priority of the items in the list. Here, assume that the display priority of the second item is lowered by the display priority changing processing.

After the display priority changing processing is executed, when a second user (who is different from the first user), who operates the second client device 2, inputs a search condition for outputting a list that would include the second item selected by the first user, the second client device 2 sends the search instruction data to the information presentation server 1. The list information sending unit 53 in the information presentation server 1 generates list data of a list in which the display order of the second item is lowered or the second item is not included, and sends the generated list data to the second client device 2. For example, in the example of FIG. 6, when the first user selects the item 71 "Fuji" at first, then selects the item 72 "Ai", the display priority of the item 71 "Fuji" is lowered. In this case, the list information sending unit 53 sends list information of a list screen in which the item 71 "Fuji" is displayed in the lower part, or the item 71 "Fuji" is not included.

As described above, if the first user selects the first item after the second item, the display priority of the second item is lowered. Thus, on the list screen to be presented to the second user who accesses the site later, the order of the second item is lowered or the second item is not displayed. In this way, it is possible to substantively prevent information, which may cause a trouble to the second user, from being provided, and also prevent the user from doing unnecessary work. Accordingly, the load on the server can also be reduced due to the reduced number of requests from users.

Figure 8:
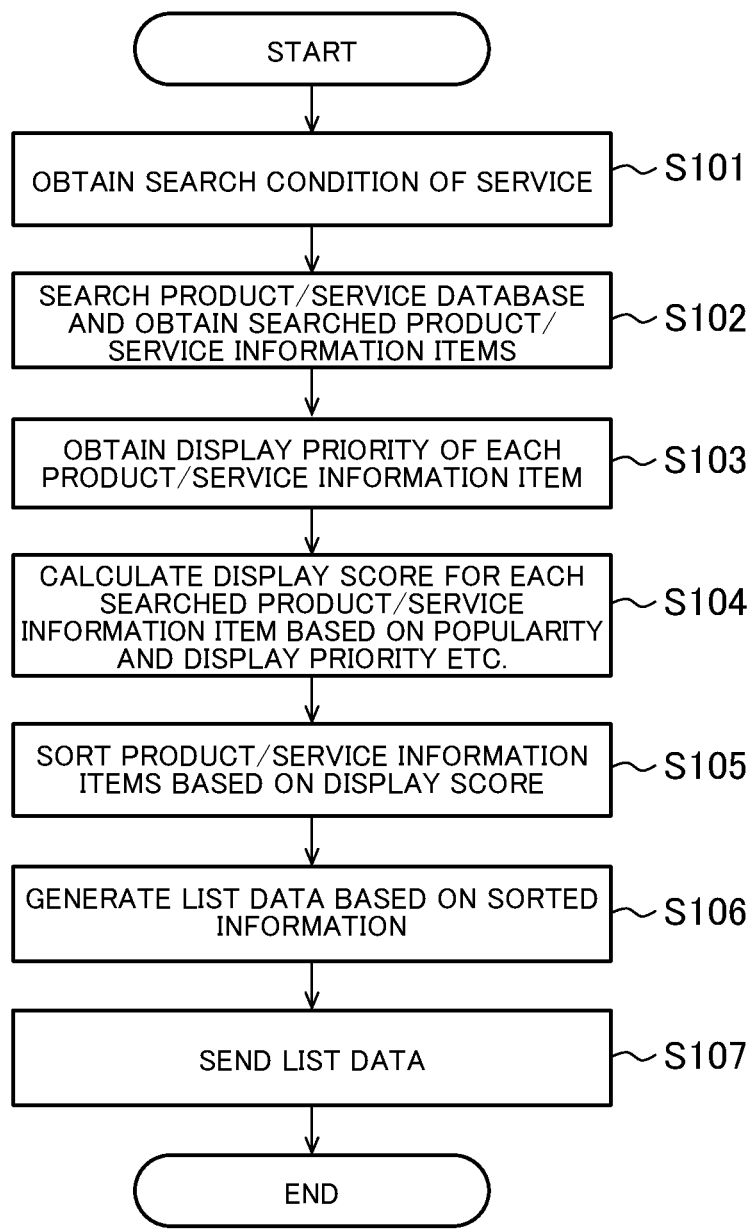
FIG. 8 is a flow chart indicating an example of processing of a search condition obtaining unit and a list information sending unit.

Next, details of the processing in which the search condition is sent and then the list information is sent will be discussed. FIG. 8 is an example of a flow chart of processing of the search condition obtaining unit 52 and the list information sending unit 53.

When the client device 2 sends search instruction data, the search condition obtaining unit 52 obtains such search instruction data and also a search condition of the service (an example of trade object) from the search instruction data (step S101). In the example of FIG. 5, the search condition is a search keyword or a search category. In the following, when "search condition" is simply mentioned, it indicates a search condition for searching product service information.

Subsequently, the list information sending unit 53 searches product/service information stored in the product/service information storing unit 61 with use of the obtained search condition, and obtains the searched product/service information (step S102). At this time, the list information sending unit 53 may also obtain a search score, which indicates a matching degree between the searched product/service information and the search condition.

FIG. 9 illustrates an example of the product/service information. FIG. 9 is an example of food service information of a restaurant information site, and one row corresponds to one item of product/service information. In the example of FIG. 9, each item of the product/service information includes elements such as a service ID for specifying a service, a name, a category of a food service, an area where a food service facility is located, an introductory sentence of the facility, an estimated budget, access, and popularity of the food service facility. The elements included in one item of product/service information are to be displayed on a detailed screen of a restaurant information site, for example, and actually other elements of information than the elements described in FIG. 9 are also included in one item of product/service information. In the example of FIG. 5 and FIG. 9, the search condition is set such that, among the elements of the product/service information, a character string displayed on the detailed screen, for example, includes a search keyword, and a category of the product/service information is the same as the search category. In a site for selling products, product/service information may include a product ID (substantively the same as a service ID) for specifying the product, a name, a category, and a price. Further, the product/service information may include an evaluation score that is calculated using not only popularity but other indicators, such as satisfaction level.

Subsequently, the list information sending unit 53 obtains, from the priority information storing unit 63, display priority of each of the searched product/service information (step S103). The display priority is stored in the priority information storing unit 63 as priority information associated with a combination of a service ID and a search condition, by the display priority changing processing of the display priority changing unit 56.

FIG. 10 illustrates an example of priority information. Each row in FIG. 10 corresponds to one item of priority information, and each item of priority information includes elements such as a service ID, a search keyword and a search category each of which indicates a search condition, display priority, and a update time of the display priority. The list information sending unit 53 searches the priority information using, as a key, a search keyword and a search category, which are search condition, and a service ID of the searched product/service information (trade object), and obtains the display priority included in the searched priority information as the display priority of the product/service information. In the example of FIG. 10, assume that when display priority is higher, a value of the display priority is greater. When the priority information is not stored in the priority information storing unit 63, assume that display priority under the service ID and the search condition is a default value (e.g., 0). The relationship between the value of display priority and the display priority may be determined freely as long as consistency with a display score described below is maintained, and a value of display priority may set to be smaller when a display priority is higher.

Upon obtaining the display priority, the list information sending unit 53 calculates a display score of the searched product/service information based on, for example, the popularity, the display priority, and the similarity with the search condition (search score) (step S104). Here, a display score becomes greater when a value of display priority or a value of popularity is greater and a similarity between a search condition and product/service information is greater. Further, when a display score is greater, a display order in a list is earlier. The list information sending unit 53 may use the evaluation score described above when calculating the display score.

When a display score of each item is calculated, the list information sending unit 53 sorts product/service information items by descending orders of the display scores (step S105), and generates list data in which the sorted product/service information items in a sorted order are included (step S106). Here, product/service information items stored in the list data are items of the list data. As such, the list data indicating a list, in which an item having higher display score is displayed higher, is sent. The list information sending unit 53 may exclude some of the product/service information items that have a lower display score than a threshold value from generation target of the list (set other product/service information items to generation target of the list), and generate list data in which such product/service information items are not included. Each item included in the list data has information such as a service ID, a name, budget, and access, and the list data includes search conditions and list IDs that are uniquely generated. Further, the search condition may be used to specify a list. In that case, the list data may not necessarily include list IDs.

In a case where the number of product/service information items to be stored in the list data is smaller than the minimum number for the reasons that, for example, some product/service information items are excluded from the generation target of the list, the list information sending unit 53 may change some of the search conditions, and add product/service information items, which are searched according to the changed search conditions, to the generation target of the list. Specifically, the list information sending unit 53 analyzes the search conditions and obtains the condition of an area where the restaurant providing the service is located. Subsequently, the list information sending unit 53 changes the condition of the area to the condition of the neighboring or adjacent area (e.g., area around the neighboring station) of the area, and searches for product/service information items that satisfy the changed search condition. The list information sending unit 53 sorts the searched product/service information items based on popularity, for example, and stores the sorted product/service information items in addition to the items that are already stored in the list data. In this way, the list information sending unit 53 generates list information including multiple items respectively indicating product/service information that is searched according to the original search condition and set to the generation target of the list, and the product/service information searched under the changed search condition. Further, not only the neighboring or adjacent area, but also an area which the user highly likely reaches within a predetermined period of time based on the moving direction and the current position of the user may be estimated, and the search condition may be changed according to such area.

When the list data is generated, the list information sending unit 53 sends the generated list data to the user (step S107).

Figure 11:
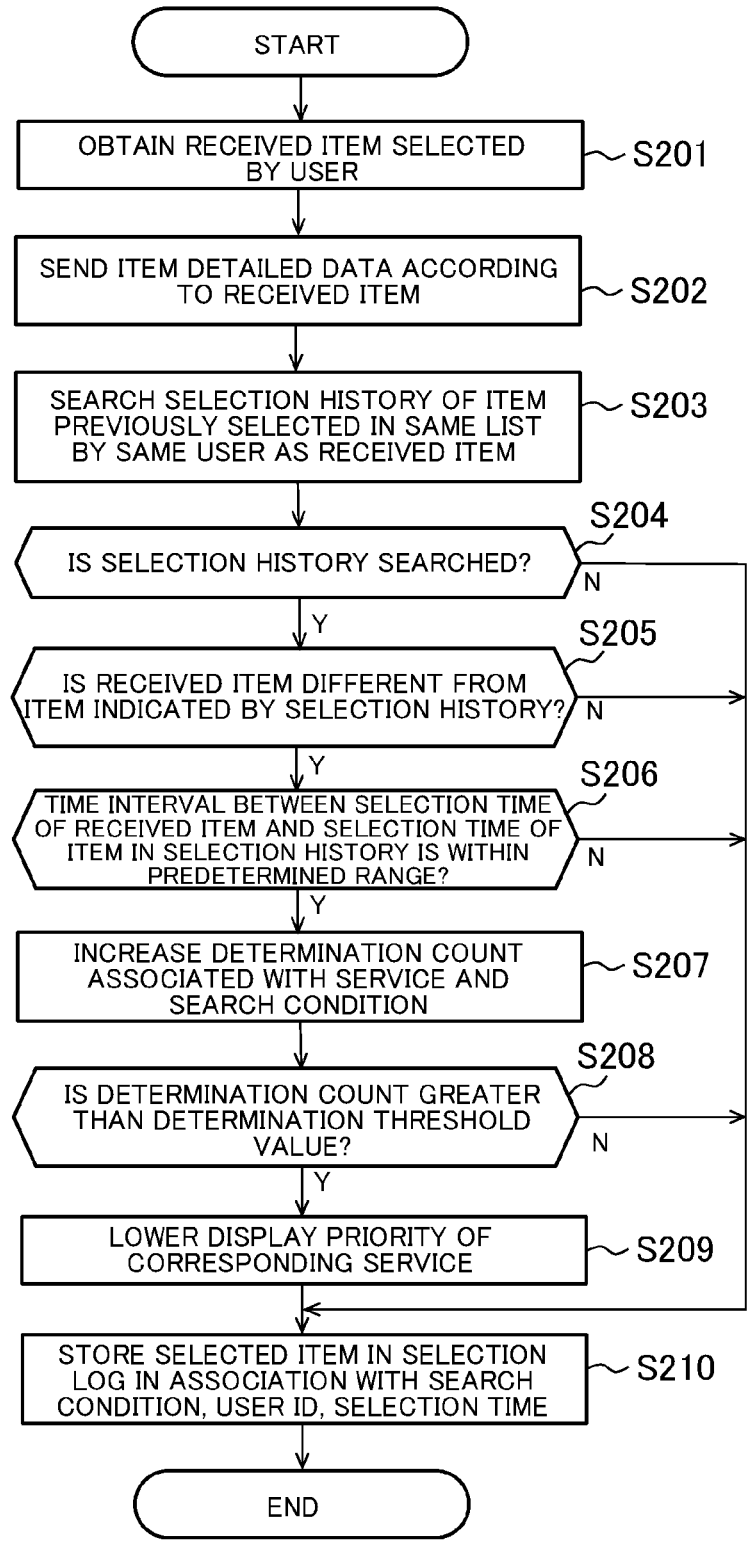
FIG. 11 is a flow chart indicating an example of processing of a selected item obtaining unit, a detailed information sending unit, and a display priority changing unit.

Next, processing for changing display priority will be discussed. FIG. 11 illustrates an example of a flow chart of processing of the selected item obtaining unit 54, the detailed information sending unit 55, and the display priority changing unit 56. Here, a case will be explained in which execution of the processing for changing display priority is triggered by the information presentation server 1 receiving the selected item data, although timing to execute processing may be varied. For example, processing for changing display priority may be periodically executed in the background. In the following, details of processing of the selected item obtaining unit 54, the detailed information sending unit 55, and the display priority changing unit 56 will be explained according to the flow chart of FIG. 11. FIG. 11 illustrates processing of a food service, although the same processing may also be applied to products if information of products (e.g., product ID) is used instead of information of services (e.g., service ID).

Upon receiving selected item data from a client device 2 operated by a user, the selected item obtaining unit 54 obtains, from the selected item data, a service ID for specifying a selected item (received item), a user ID for specifying the user, a search condition, and a list ID (step S201). The service ID indicates the item selected by the user from a plurality of items included in the list.

Subsequently, the detailed information sending unit 55 obtains more detailed information (e.g., phone number, photograph, map, menu) of the received item from the product/service information storing unit 61, generates item detailed data for displaying a detailed screen in accordance with the received item, and sends the generated item detailed data (step S202).

After the detailed information sending unit 55 sends the item detailed data, the display priority changing unit 56 compares a first item selected by a certain user and included in the selected item data received in step S201 with a second item selected prior to the first item by the same user and included in the same list. When the first item is different from the second item, the detailed information sending unit 55 executes processing for lowering display priority of the second item. The processing for comparing between the first item and the second item and lowering display priority based on the result of the comparison may be executed in parallel with the processing in step S202.

More specifically, the display priority changing unit 56 obtains, from a plurality of selection histories stored in the selection history storing unit 62, a selection history of the item (second item) previously selected in the same list by the same user who selected the item (first item) received in step S201 (step S203). In step S203, the display priority changing unit 56 searches the selection histories using, as a key, the user ID and the list ID included in the received selected item data.

FIG. 12 illustrates an example of a selection history. A selection history is generated for each user ID, and includes a user ID, a selection time, a service ID, a list ID, search conditions (search keyword and search category) of the list. Information included in the selection history is information about an item selected by a user of the user ID, and is stored at the time the selected item data is received. The selection time is the time when the user selects (or receives selected item data) the item, and the list ID is information for specifying a list that includes the selected item. For example, FIG. 12 shows that a user having a user ID "user Z" selects, from a list having a list ID "5011", an item having a service ID "r3001" at 17:48, and selects an item having a service ID "r3002" at 17:50. At the time of step S203, information about the item selected by the user and obtained in step S201 has not been stored in the selection history shown in FIG. 12.

When the selection history is searched in step S203 (Y in step S204), the display priority changing unit 56 compares the service ID of the received item (first item) with the service ID (second item) of the selection history (step S205). In a case where the compared two items (service IDs) are different from each other (Y in step S205) and time interval t1 between the selection time of the first item and the selection time of the selection history of the second item is within a predetermined range (e.g., within 5 minutes or within 1 to 10 minutes) (N in step S206), the display priority changing unit 56 increases or decreases a determination count, which indicates how many users are stored in the storage unit 12 in association with the service ID of the second item and the search condition of the list (step S207).

FIG. 13 illustrates an example of determination count information. The determination count information is information made unique by a combination of a service or a product with a search condition of a list, and each determination count information item stored in the storage unit 12 includes a service ID, a search condition (search keyword and search category) of a list, a determination count, and update time. The determination count information is stored in the storage unit 12 in the information presentation server 1, but may be stored in other server.

In step S207, the display priority changing unit 56 may increase the determination count, which indicates the number of the users, by one, and decrease the determination count in view of the time lapse. For example, when the more time has elapsed since the last update of the determination count, the more determination count of determination count information may be reduced. The display priority changing unit 56 may reduce the determination count by one, or by 0.1, every time a predetermined time has passed. For example, the display priority changing unit 56 may subtract a greater value from the determination count as the difference between the update time of the determination count information and the present time increases, or, reset the determination count to 0 when the difference between the update time of the determination count information and the present time is greater than the threshold value. Alternatively, the display priority changing unit 56 may execute processing for decreasing the determination count at the timing of processing in step S207. With such processing, the determination count indicates the number of users select the first item and the second item, which are different from each other, and the increase and decrease of the determination count indicates an inclination of increase and decrease of the users for a predetermined period in the past. In this regard, the determination count may be calculated for each time without executing the processing in step S207 in which the storage unit 12 stores the determination count. Among the selection histories indicating that the second item is selected in a period of time between the present time and a predetermined period of time before the present time, the display priority changing unit 56 may obtain the number of selection histories (number of users) indicating that other item is selected at the time in a predetermined period of time (corresponding to time interval t1) before the above described time as the determination count indicating the number of users. In this case, the determination count indicates the number of users.

When the determination count is changed in step S207 and the value of the determination count regarding the second item and the search condition of the list is greater than a predetermined determination threshold value, the display priority changing unit 56 lowers the display priority of the service (Y in step S208) (step S209). More specifically, in a case where the priority information storing unit 63 stores priority information about a combination of a service ID and a search condition, the display priority changing unit 56 subtracts a predetermined value from the value of the display priority included in the priority information corresponding to the service ID, updates the display priority of the priority information corresponding to the service ID stored in the priority information storing unit 63 based on the subtracted value, and updates the update time to the present time. On the other hand, in a case where the priority information about the combination of the service ID and the search condition is not stored, the display priority changing unit 56 subtracts a predetermined value from a predetermined initial value (e.g., 0), and newly stores the subtracted value of the display priority and the priority information having the service ID, the search condition, and the present time (update time) to the priority information storing unit 63. The priority information may include the initial update time. In this case, the display priority changing unit 56 updates the initial update time to the present time when the display priority before the update is a predetermined initial value, and stores the priority information including the initial update time to the priority information storing unit 63 when the priority information is not stored. The update time and the initial update time may be used in the processing discussed below. When the determination count becomes 0 regarding the combination of the service ID and the search condition, the display priority changing unit 56 may return the display priority of such combination to the initial value.

After the display priority is set as described above, when the search condition obtaining unit 52 receives, from the user, search instruction data, which instructs to search under the same search condition of the priority information, the processing as shown in FIG. 8 is executed for such search condition. In this way, a service or a product having a lower value of display priority will have a lower display order in a new list generated after the display priority is lowered, or be excluded from the newly generated list.

The reasons why the user selects the first item in the list and then selects the second item, which is another item in the list, may include a certain proportion of cases in which services or products have some kind of problem, such as a case of food service in which the user calls a restaurant of the first item but the restaurant is fully booked, or a case in which the service (or product) of the first item is not appropriate in relationship with the search condition.

On the other hand, the display priority changing unit 56 may store the priority information in the priority information storing unit 63 in association only with a service ID (or product ID), not with a search condition. In this case, information about the determination count in step S207 is also stored without being associated with the search condition. This may decrease accuracy of search because it is not possible to reflect whether the relationship between the search condition and the item is appropriate, but it is possible to detect a case in which the restaurant is fully booked and cannot be reserved, and reduce the possibility that the service or the product, which is difficult to be offered, is displayed in higher in the list searched under other search conditions.

The display priority changing unit 56 may execute the processing for lowering the display priority of the second item based on whether an attribute in the first item is the same as an attribute in the second item. For example, in the processing of step S207 for increasing the determination count, in a case where any one of the conditions described below is satisfied, the determination count may be increased or an amount of increase in the determination count in this case may be greater compared to other cases. One of the conditions is that the category of the first item in the service is the same as the category of the second item or the categories are in sibling relation having the same parent category. Another condition is that the budget (standard price) for the first item is the same as or in the close price range as the second item, or the difference between the budgets is less than a threshold value. The other condition is that the distance between the restaurant of the first item and the restaurant of the second item is less than a predetermined distance, or the areas of the restaurants are the same. Other than the above, a condition may be that one of the keywords in the introductory sentence of the first item is the same as that of the second item.

When the user intends to sequentially select items of the services having the same attribute and common aspects, the user may be more willing to receive such type of services (purchase a product) than a case where the user sequentially selects services that have no common aspects. As such, it is highly likely that the user's operation to select an item and then select another item does not suggest the user's whim, but suggests that former item has any kind of problem. Thus, by taking the attribute of the service into consideration, it is possible to accurately reflect whether providing the service or the product may cause any kind of problem by using the display priority.

After the processing in steps S204 to S209 is executed, the selected item obtaining unit 54 causes the selection history storing unit 62 to store the service ID for specifying the item in association with the user ID, the search condition, the list ID, and the selection time at which the item is selected (step S210). Here, the selection history is information which is unique by a user ID. When the selection history storing unit 62 stores the selection history under the current user ID, the selection time and the search condition of the selection history are updated. When the selection history is not stored, new selection history is added to the selection history storing unit 62. When the same user selects an item in the list next time or later, the stored selection history is used to execute the processing as shown in FIG. 11.

The display priority changing unit 56 may reset the value of the display priority of the trade object to the initial value after a predetermined period of time has passed since the display priority of the trade object is lowered. For example, the display priority changing unit 56 may periodically search for priority information having the update time (or initial update time), a predetermined period of time (e.g., three hours) before the present time in the priority information stored in the priority information storing unit 63, and reset the display priority of the searched priority information to the initial value. In this way, it is possible to consider a case in which a table is available as time passes. Intervals between periodical searches may be set differently for each product or service.

FIG. 14 illustrates an example of priority information when a predetermined period of time elapses from FIG. 10. For example, in FIG. 14, display priority of the service ID "r0001" is reset to the initial value 0 after three hours has passed from the status of FIG. 10.

Regarding a certain trade object, its display priority, which is lowered once, returns to the original state as time passes, and thus it is possible to control the display priority more efficiently based on the actual state of the trade object, which cannot be offered for the user for the temporary problems that can be eliminated by time, such as being fully booked or out of stock because stock is not managed, for example. In this way, it is possible to display a list in which the trade object, which is originally to be listed in higher position but its display priority is lowered for the temporary problem, is displayed according to the original display priority at the time when the problem is highly likely solved.

REFERENCE SIGNS LIST

1 information presentation server, 2 client device, 3 network, 11 processor, 12 storage unit, 13 communication unit, 14 input/output unit, 51 condition input screen sending unit, 52 search condition obtaining unit, 53 list information sending unit, 54 selected item obtaining unit, 55 detailed information sending unit, 56 display priority changing unit, 61 product/service information storing unit, 62 selection history storing unit, 63 priority information storing unit, 70 search condition input area, 71, 72, 73 items, t1 time interval.

The invention claimed is:

1. A list presentation device comprising:
   at least one memory configured to store computer program code;
   at least one processor configured to access said memory and operate as instructed by said computer program code, said computer program code including:
   list presentation code configured to cause at least one of said at least one processor to, in response to a list request received from a first client device of a first user over a network, present a first list of first items each indicating a trade object, the first items being listed based on display priorities stored in a storage in association with a plurality of trade objects;
   detailed information presentation code configured to cause at least one of said at least one processor to, each time one item is selected from the presented first list, present detailed information about the trade object indicated by the selected item;
   display priority changing code configured to cause at least one of said at least one processor to lower, in a case where a first item is selected from the presented first list and then a second item is selected from the presented first list, a display priority stored in the storage in association with a first trade object among the plurality of trade objects which is indicated by the first item;
   wherein the list presentation code is further configured to cause at least one of said at least one processor to, in response to a second list request received from a second client device over the network, present a second list of second items, the second items being listed based on the lowered display priority,
   whereby when a display order associated with the first trade object is lowered, a number of requests from a user of the second client device is reduced and a load on the list presentation device is reduced.

2. The list presentation device according to claim 1,
   wherein the list presentation code causes at least one of said at least one processor to present the first list of a plurality of first items to the first user based on a first search condition in a first list request from the first user; and
   wherein, in a case where the second item is selected by the first user, the display priority changing code causes at least one of said at least one processor to lower the display priority in association with the first search condition and the first trade object.

3. The list presentation device according to claim 1,
   wherein an item selected by the first user among a plurality of trade objects included in the first list and a time at which the first user selects the item are stored in the storage that stores the item and the time in association with the first user and the first list, and
   wherein, in a case where an interval between the time at which the first user selects the first item from the first list and the time at which the first user selects the second item from the first list is in a given range, the display priority changing code causes at least one of said at least one processor to lower the display priority of the first trade object.

4. The list presentation device according to claim 1,
wherein the display priority changing code causes at least one of said at least one processor to lower the display priority of the first trade object based on a number of users who select the first item among a plurality of items included in the first list, before selecting selects the second item among the plurality of items.

5. The list presentation device according to claim 1,
wherein, in a case where the first user selects the second item among the first items included in the first list, the display priority changing code further causes at least one of said at least one processor to lower the display priority of the first trade object based on an attribute associated with the first trade object indicated by the first item and an attribute associated with a second trade object indicated by the second item.

6. The list presentation device according to claim 5,
wherein, in a case where the first user selects the first item among the first items included in the first list, the display priority changing code causes at least one of said at least one processor to lower the display priority of the second item based on a price of the first trade object and a price of the second trade object.

7. The list presentation device according to claim 5,
wherein, in a case where the first user selects the first item among the first items included in the first list, the display priority changing code causes at least one of said at least one processor to lower the display priority of the first trade object based on a distance between a real position of the first trade object and a real position of the second trade object.

8. The list presentation device according to claim 5,
wherein, in a case where the first user selects the first item among the first items included in the first list, the display priority changing code causes at least one of said at least one processor to lower the display priority of the first trade object based on a category to which the second trade object belongs and a category to which the first trade object belongs.

9. The list presentation device according to claim 1,
wherein the list presentation code causes at least one of said at least one processor to:
determine some of the trade objects that satisfy a second search condition included in the second list request, wherein the second list request is received from a second user, as list presentation targets based on the display priority stored in the storage, and, in a case where a number of the determined trade objects is smaller than a threshold value; and
generate the second list that includes the second plurality of second items respectively indicating the determined trade objects and a plurality of trade objects that satisfy a condition obtained by partially changing the second search condition.

10. The list presentation device according to claim 9,
wherein, in a case where the number of the determined items is smaller than the threshold value, the list presentation code causes at least one of said at least one processor to present the second list that includes the second plurality of second items respectively indicating the determined trade objects and a plurality of trade objects that satisfy a condition obtained by changing the second search condition such that an area to which the trade objects belong is changed to an area neighboring or adjacent to the area.

11. The list presentation device according to claim 9,
wherein, in a case where the number of the determined items is smaller than the threshold value, the list presentation code causes at least one of said at least one processor to present the second list that includes the second plurality of second items respectively indicating the determined trade objects and the trade objects that satisfy a condition obtained by changing the second search condition such that an area to which the trade objects belong is changed to an area in a moving direction of the second user.

12. The list presentation device according to claim 1,
wherein the display priority changing code causes at least one of said at least one processor to return the lowered display priority to an initial value according to a lapse of time.

13. The list presentation device according to claim 1,
wherein said computer program code further includes selected item obtaining code configured to cause at least one of said at least one processor to obtain, at a first time, the first item that is selected by the first user and to obtain, at a second time, the second item that is selected by the first user, wherein the second time is a first time duration later than the first time;
wherein the display priority changing code causes at least one of said at least one processor to increase a determination count based on a determining that the first time duration is less than a threshold time, to determine whether the determination count is greater than a threshold count and to lower the display priority associated with the first trade object when it is determined that the determination count is greater than the threshold count.

14. A list presentation method performed by a list presentation device, wherein the list presentation device comprises at least one computer, the list presentation method comprising:
presenting, in response to a list request received from a first client device of a first user over a network, a first list of items each indicating a trade object, the items being listed based on display priorities stored in a storage in association with a plurality of trade objects;
presenting, each time one item is selected from the presented first list, detailed information about the trade object indicated by the selected item;
lowering, in a case where a first item is selected from the presented first list and then a second item is selected from the presented first list, a display priority of a first trade object indicated by the selected item; and
presenting, in response to a second list request received from a second client device over the network, a second list of second items, the second items being listed based on the lowered display priority, whereby when a display order associated with the first trade object is lowered, a number of requests from a user of the second client device is reduced and a load on the list presentation device is reduced.

* * * * *